United States Patent
Hashimoto et al.

(10) Patent No.: US 12,019,511 B2
(45) Date of Patent: Jun. 25, 2024

(54) INFORMATION PROCESSING APPARATUS, METHOD, AND STORAGE MEDIUM

(71) Applicant: KABUSHIKI KAISHA TOSHIBA, Tokyo (JP)

(72) Inventors: Mikio Hashimoto, Tokyo (JP); Atsushi Shimbo, Tokyo (JP); Jiro Amemiya, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 18/181,212

(22) Filed: Mar. 9, 2023

(65) Prior Publication Data

US 2024/0095118 A1    Mar. 21, 2024

(30) Foreign Application Priority Data

Sep. 16, 2022    (JP) ................................. 2022-148042

(51) Int. Cl.
    *G06F 11/10*       (2006.01)
    *H04L 9/14*        (2006.01)
    *H04L 9/30*        (2006.01)

(52) U.S. Cl.
    CPC ................ *G06F 11/10* (2013.01); *H04L 9/14* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 7,526,656 B2* | 4/2009 | Inomata | G06F 21/606 380/282 |
| 7,590,869 B2 | 9/2009 | Hashimoto | |
| 8,848,905 B1* | 9/2014 | Hamlet | H04L 9/3278 726/20 |

(Continued)

FOREIGN PATENT DOCUMENTS

| | | |
|---|---|---|
| JP | 4263976 B2 | 2/2009 |
| JP | 4263976 B2 | 5/2009 |

(Continued)

OTHER PUBLICATIONS

"Confidential Computing concepts", Google Cloud, 2020 (Last updated: Mar. 6, 2023), 6 pages https://cloud.google.com/compute/confidential-vm/docs/about-cvm?hl=ja.

(Continued)

*Primary Examiner* — Daniel F. McMahon
(74) *Attorney, Agent, or Firm* — Holtz, Holtz & Volek PC

(57) ABSTRACT

According to one embodiment, an information processing apparatus is allowed to access a storage device storing time-series data generated by a first device. The information processing apparatus includes a processor holding a first public key and a first private key. The processor is configured to acquire a program for correcting an error in first data on a first product from a first entity. The processor is configured to correct the correction target first data, using data in a predetermined range of the time-series data. The processor is configured to generate ground data indicating correction grounds for the corrected correction target first data, based on the data in the predetermined range, and add the ground data to the corrected correction target first data.

13 Claims, 13 Drawing Sheets

(56) References Cited

U.S. PATENT DOCUMENTS

| | | | | |
|---|---|---|---|---|
| 2005/0005121 | A1* | 1/2005 | Chen | H04L 9/3073 713/171 |
| 2007/0063875 | A1* | 3/2007 | Hoffberg | G08G 1/0133 455/456.3 |
| 2011/0002461 | A1* | 1/2011 | Erhart | G06F 21/73 340/5.83 |
| 2011/0162083 | A1 | 6/2011 | Apvrille et al. | |
| 2013/0254636 | A1* | 9/2013 | Kirkpatrick | H04L 9/0866 714/752 |
| 2017/0293766 | A1* | 10/2017 | Schnjakin | G06F 21/602 |
| 2020/0036535 | A1* | 1/2020 | Povey | H04L 9/0897 |
| 2020/0076624 | A1* | 3/2020 | Cambou | H04L 9/0643 |
| 2021/0234686 | A1* | 7/2021 | Takeuchi | H04L 9/3239 |
| 2021/0266164 | A1* | 8/2021 | Garcia-Morchon | H04L 9/0841 |
| 2022/0188222 | A1 | 6/2022 | Hashimoto et al. | |
| 2023/0299971 | A1 | 9/2023 | Hashimoto et al. | |

FOREIGN PATENT DOCUMENTS

| | | |
|---|---|---|
| JP | 5076110 B2 | 9/2012 |
| JP | 5076110 B2 | 11/2012 |
| JP | 2014137748 A | 7/2014 |
| JP | 2015056083 A | 3/2015 |
| JP | 2022094755 A | 6/2022 |
| JP | 2023137873 A | 9/2023 |

OTHER PUBLICATIONS

Advanced Micro Devices, Inc., "AMD EPYCTM 7002 Series Processors in the Cloud: NGINXTM on Google Compute Engine with N2D Confidential VMs", Cloud Solutions, Jul. 2020, 3 pages, https://www.amd.com/system/files/documents/amd-epyc7002-gcpn2d-confidential-nginx.pdf.

Confidential Computing Consortiu, "Confidential Computing: Hardware-Based Trusted Execution for Applications and Data", V1.2, Jan. 2021, 15 pages, https://confidentialcomputing.io/wp-content/uploads/sites/85/2021/03/confidentialcomputing_outreach_whitepaper-8-5x11-1.pdf.

Qi, et al., "Efficient Data Access Control With Fine-Grained Data Protection in Cloud-Assisted IIoT", IEEE Internet of Things Journal (vol. 8, No. 4), 2021, pp. 2886-2899, DOI: 10.1109/JIOT.2020.3020979.

* cited by examiner

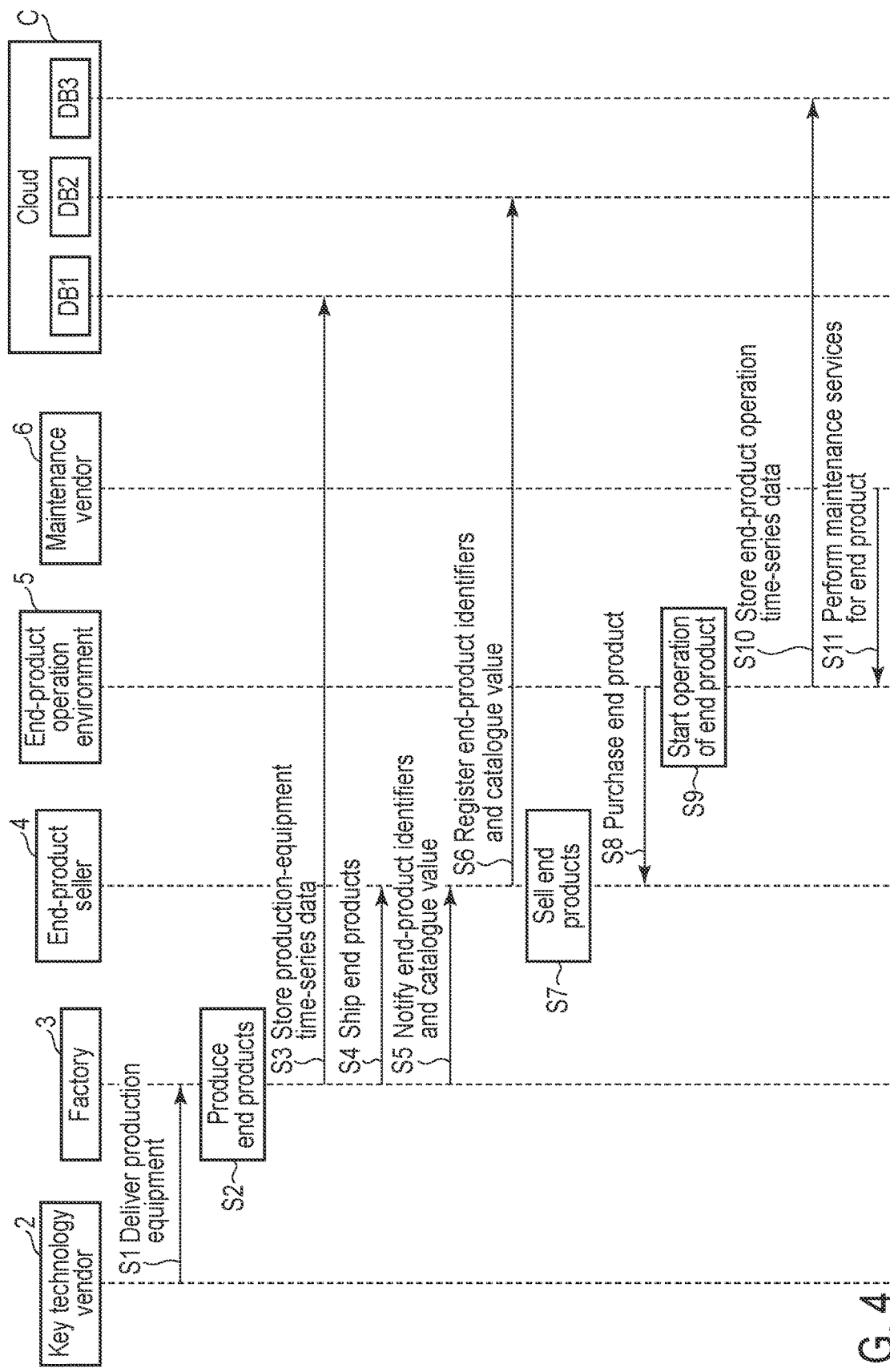
F I G. 4

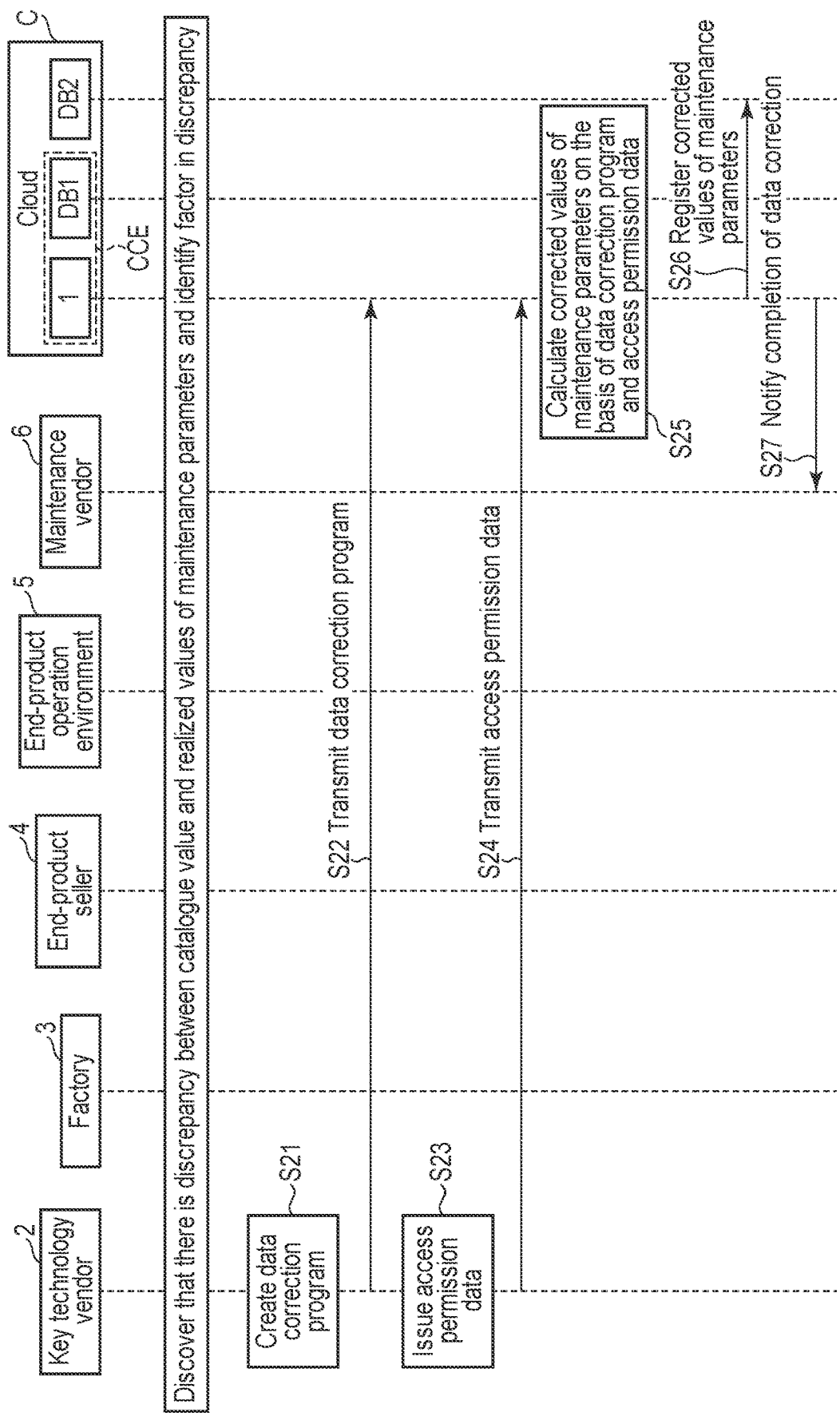
F I G. 5

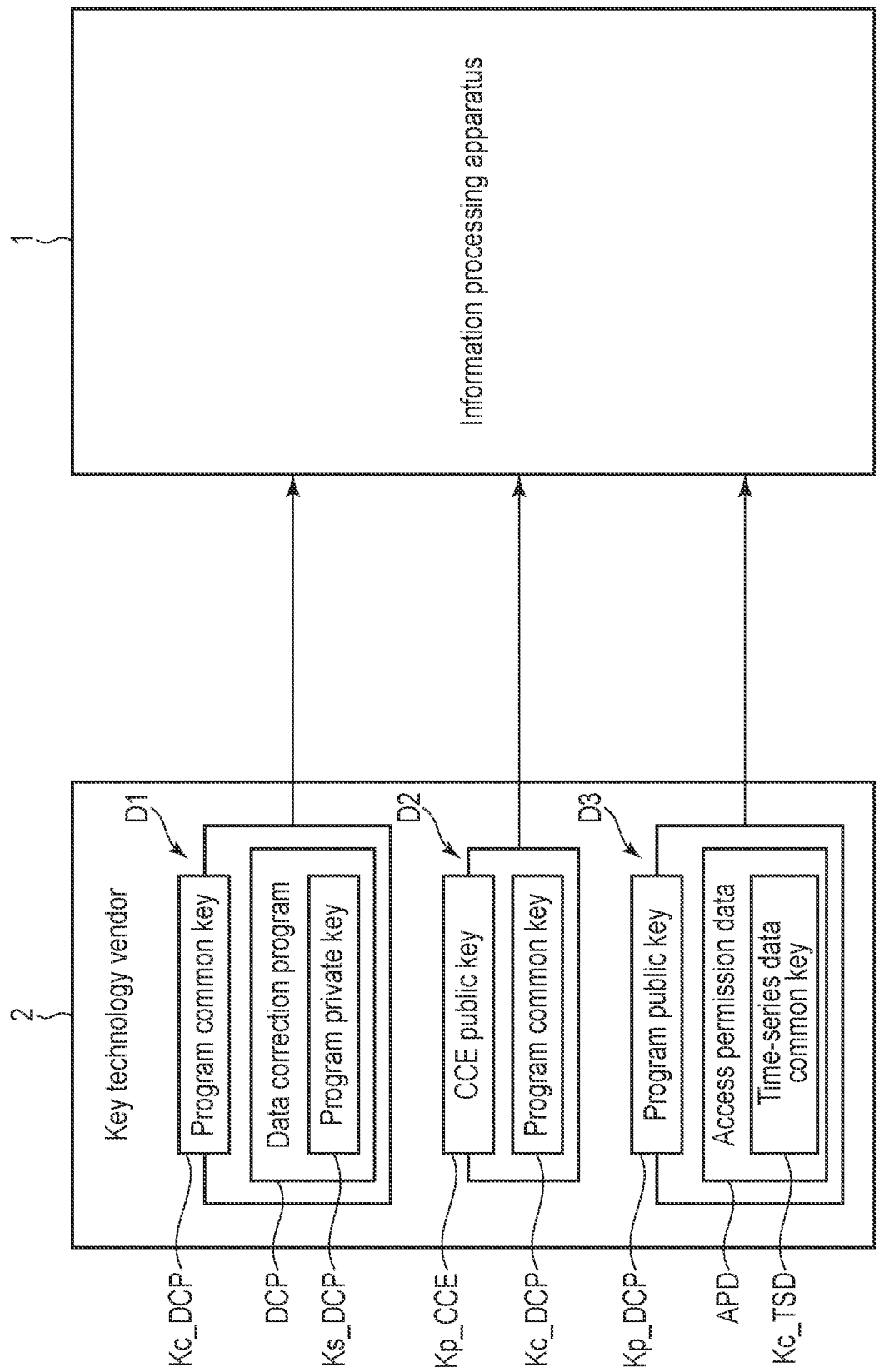
F I G. 7

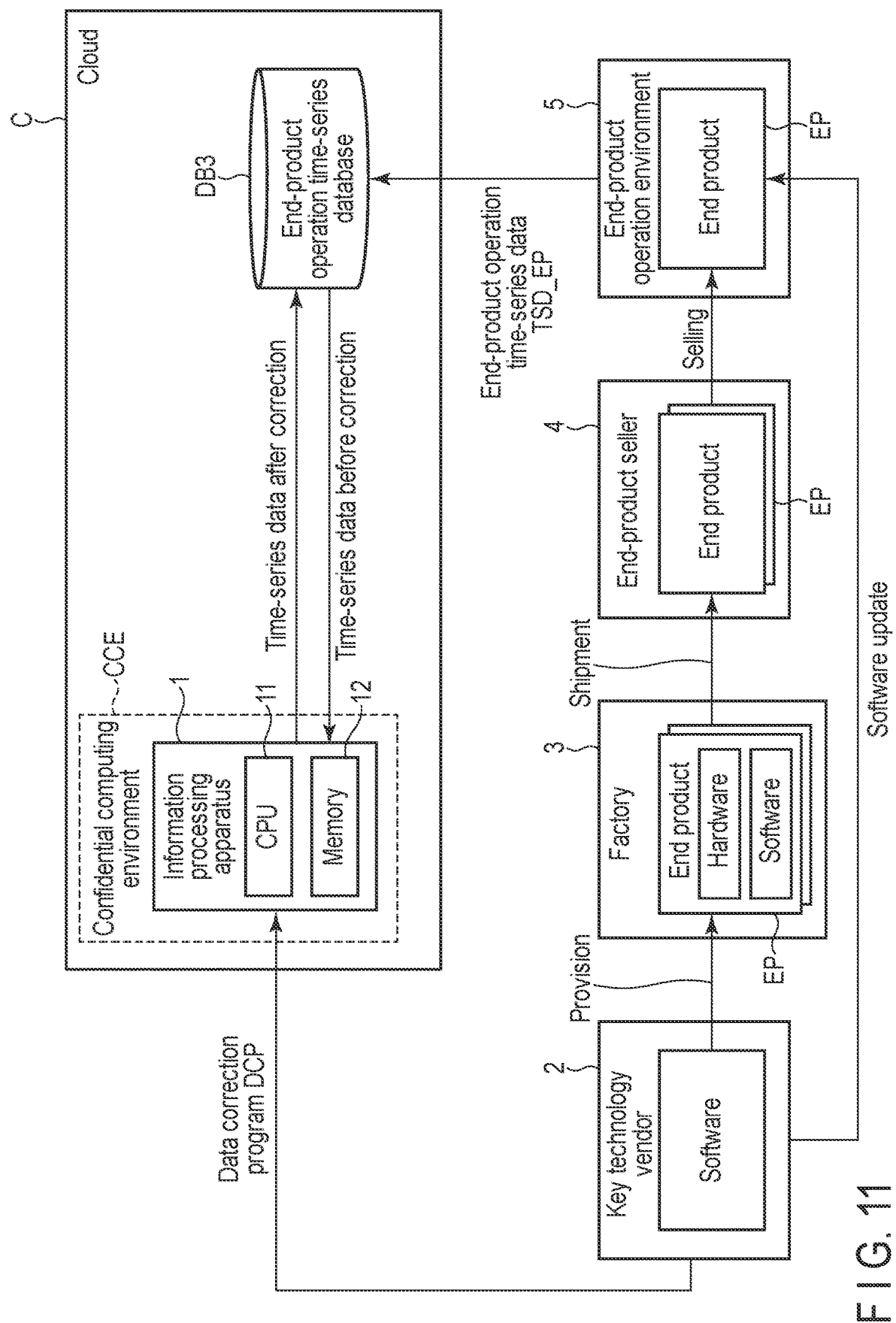
F I G. 11

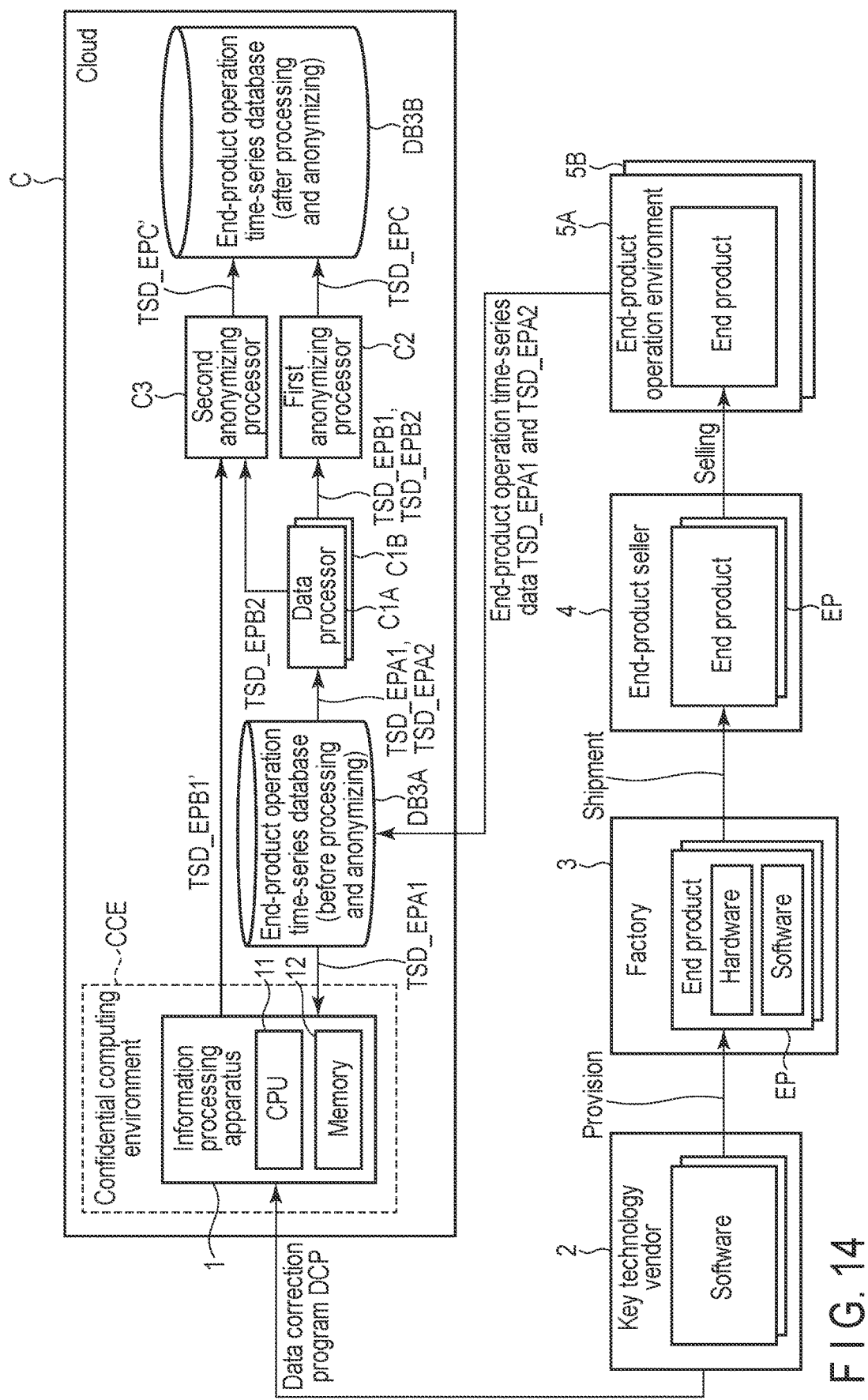
F I G. 14

INFORMATION PROCESSING APPARATUS, METHOD, AND STORAGE MEDIUM

CROSS-REFERENCE TO RELATED APPLICATIONS

This application is based upon and claims the benefit of priority from Japanese Patent Application No. 2022-148042, filed Sep. 16, 2022, the entire contents of which are incorporated herein by reference.

FIELD

Embodiments described herein relate generally to an information processing apparatus, a method, and a storage medium.

BACKGROUND

Cloud computing, which consolidates data and computation processing of the data in a data center, has been prevailing. In recent years, part of data generated when users use products or services has been expected to be utilized to further enhance the products or services and improve after-sales service. In this connection, to utilize data, it is required that generated past data be corrected depending on the situation.

However, if past data is corrected unlimitedly, the possibility of improper conduct relating to the quality of the products or services and the possibility of cyberattack increase. For this reason, it is necessary to manage the authority to correct data appropriately, clarify the grounds for correction, and then correct past data appropriately.

BRIEF DESCRIPTION OF THE DRAWINGS

FIG. 4 is a sequence chart for explaining the flow of the process executed by the interested parties according to the embodiment.

FIG. 5 is a sequence chart for explaining the flow of the process executed by the interested parties according to the embodiment.

FIG. 7 is a diagram for explaining the process executed by the key technology vendor according to the embodiment.

FIG. 11 is a diagram for explaining an information processing apparatus and interested parties relating to predetermined products according to a second embodiment.

FIG. 14 is a diagram for explaining the information processing apparatus and the interested parties relating to the predetermined products according to a second modified example.

DETAILED DESCRIPTION

Figure 1:
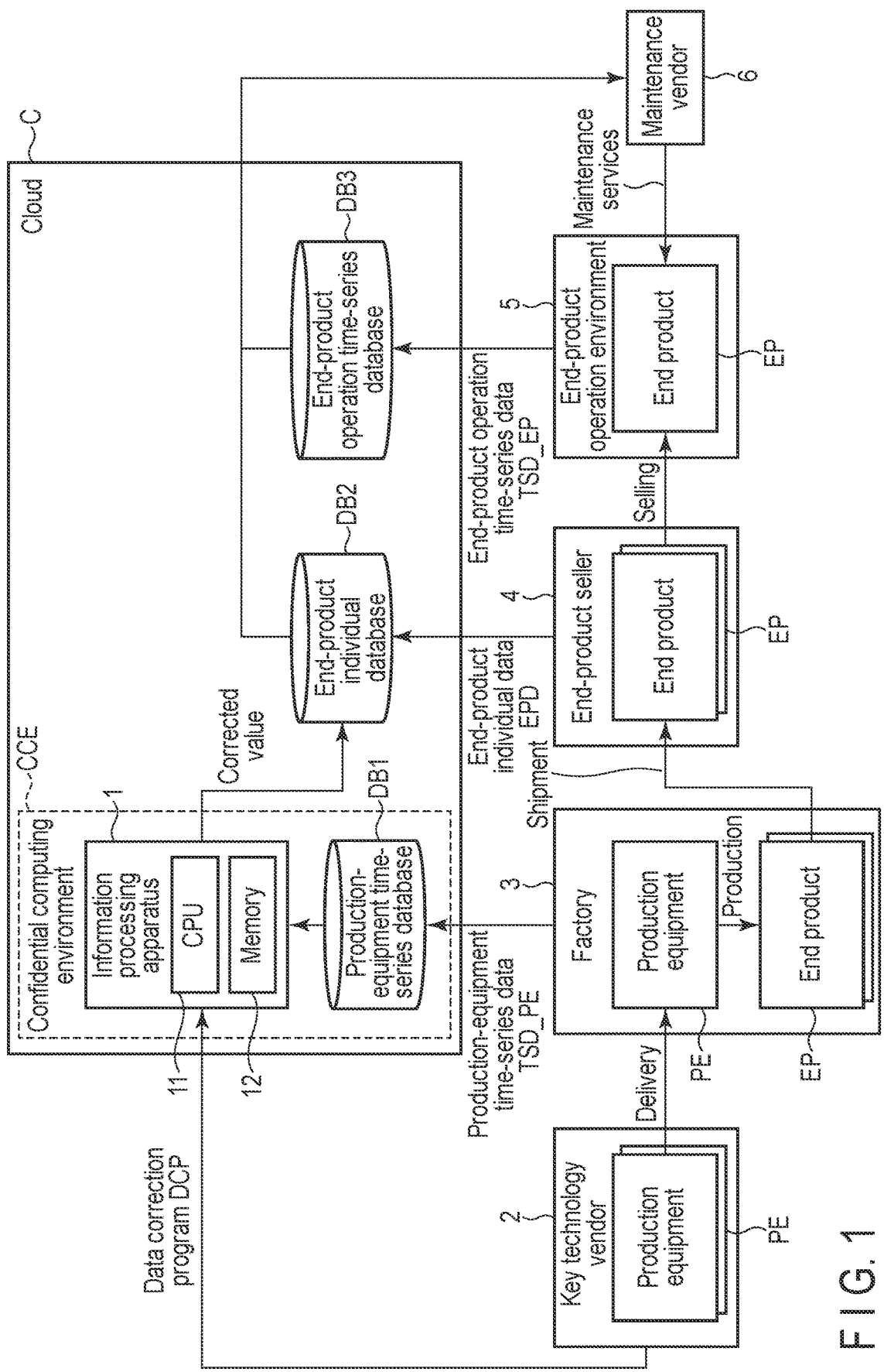
FIG. 1 is a diagram for explaining an information processing apparatus and interested parties relating to predetermined products according to a first embodiment.

In general, according to one embodiment, an information processing apparatus is allowed to access a storage device storing time-series data generated by a first device. The information processing apparatus includes a processor holding a first public key and a first private key. The processor is configured to acquire a program for correcting an error in first data on a first product and a first encryption key from a first entity, the program being encrypted with the first encryption key held by the first entity, the first encryption key being encrypted with the first public key. The processor is configured to decrypt the encrypted first encryption key, using the first private key. The processor is configured to decrypt the encrypted program, using the decrypted first encryption key. The processor is configured to identify correction target first data from the first data by executing the decrypted program. The processor is configured to correct the correction target first data, using data in a predetermined range of the time-series data. The processor is configured to generate ground data indicating correction grounds for the corrected correction target first data, based on the data in the predetermined range, and add the ground data to the corrected correction target first data.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

First Embodiment

FIG. 1 is a diagram for explaining an information processing apparatus 1 and interested parties (stakeholders) relating to predetermined products according to a first embodiment. The information processing apparatus 1 of the present embodiment is an apparatus which can decrypts an encrypted program and execute the program in a confidential computing environment CCE (for example, Intel™ SGX and AMD™ SEV). In the present embodiment, it is assumed that the information processing apparatus 1 is built on a cloud C, but the embodiment is not limited to this case.

The information processing apparatus 1 comprises a CPU 11 and a memory 12 as shown in FIG. 1. The CPU 11 is a processing unit which decrypts and executes an encrypted data correction program DCP transmitted from a key technology vendor 2 inside the CPU 11. The data correction program DCP is a program which runs in the confidential computing environment CCE and which can process data temporarily stored in the memory 12 in an encrypted state.

In the present embodiment, as shown in FIG. 1, it is assumed that the stakeholders relating to the predetermined products include the key technology vendor 2, a factory 3, an end-product seller 4, an end-product operation environment 5, and a maintenance vendor 6. Although omitted in FIG. 1, the stakeholders relating to the predetermined products further include, for example, a cloud manager who administers and manages the cloud C.

The key technology vendor 2 (first entity) represents a party that manufactures production equipment PE for producing the predetermined products and delivers the production equipment PE to the factory 3. In other words, the key technology vendor 2 represents a party that possesses a key technology relating to the production equipment PE. In the present embodiment, it is assumed that the predetermined products are, for example, seismic base-isolation rubber products and the key technology vendor 2 is, for example, a manufacturing vendor that manufactures seismic base-isolation rubber production equipment for producing the seismic base-isolation rubber products.

The factory 3 represents a party that produces the predetermined products (hereinafter, referred to as end products EP), using the production equipment PE delivered by the key technology vendor 2, and that ships the end products EP to the end-product seller 4. In the present embodiment, it is assumed that the factory 3 is, for example, a chemical maker that produces the seismic base-isolation rubber products by feeding raw materials into the seismic base-isolation rubber production equipment, processing them, and then attaching various sensors thereto.

The end-product seller 4 represents a party that sells the end products EP shipped from the factory 3 to operators (users or consumers). In the present embodiment, it is assumed that the end-product seller 4 is, for example, a store that sells the seismic base-isolation rubber products to the operators.

The end-product operation environment 5 represents an environment in which an end product EP is operated by an operator. In the present embodiment, it is assumed that the end-product operation environment 5 is, for example, a building (condominium) in which a seismic base-isolation rubber product is installed.

The maintenance vendor 6 represents a party that performs maintenance services for the end product EP operated in the end-product operation environment 5.

The factory 3 (production equipment PE) generates production-equipment time-series data TSD_PE relating to the settings and operation of the production equipment PE when the end products EP are produced, and stores it in a production-equipment time-series database DB1 on the cloud C. The production-equipment time-series data TSD_PE includes know-how specific to the key technology vendor 2 (for example, information on the key technology possessed by the key technology vendor 2), and know-how specific to the factory 3 (for example, information on the settings and operation of the production equipment PE when the end products EP are produced [more specifically, the conditions under which raw materials are processed, etc.]). Thus, under the mutual agreement between the key technology vendor 2 and the factory 3, the production-equipment time-series data TSD_PE is subjected to a predetermined cryptographic concealment process and a predetermined falsification prevention process, and the production-equipment time-series data TSD_PE in an encrypted state is stored in the production-equipment time-series database DB1. That is, the production-equipment time-series data TSD_PE is stored in the production-equipment time-series database DB1 in a state of being inaccessible to any stakeholders shown in FIG. 1 and being protected from a threat such as cyberattack or unauthorized access. In other words, the production-equipment time-series database DB1 is concealed.

The end-product seller 4 registers (stores) individual data of one or more end products EP shipped and delivered from the factory 3 (hereinafter, referred to as end-product individual data EPD) in an end-product individual database DB2 on the cloud C.

In the end-product operation environment 5, end-product operation time-series data TSD_EP is measured by a sensor, etc., included in one or more end products EP that are being used, and is stored in an end-product operation time-series database DB3 on the cloud C. As described above, when the end products EP are seismic base-isolation rubber products installed in buildings, information on a vibrational response to seismic motion is stored as the end-product operation time-series data TSD_EP.

The maintenance vendor 6 performs maintenance services for the end product EP operated in the end-product operation environment 5 on the basis of the end-product individual data EPD stored in the end-product individual database DB2 and the end-product operation time-series data TSD_EP stored in the end-product operation time-series database DB3.

In the present embodiment, it is assumed that the end-product individual database DB2 and the end-product operation time-series database DB3 are openly accessible databases (that is, databases that are accessible to anyone) unlike the production-equipment time-series database DB1.

Figure 2:
FIG. 2 is a diagram showing the data structure of production-equipment time-series data according to the embodiment.

FIG. 2 is a diagram showing an example of the data structure of the production-equipment time-series data TSD_PE.

As shown in FIG. 2, the production-equipment time-series data TSD_PE includes a production-equipment identifier PE_ID, a production-equipment time-series data identifier TSD_ID, an end-product identifier EP_ID, and data elements E1 to En (n is an integer greater than or equal to one).

The production-equipment time-series data TSD_PE shown in FIG. 2 is protected by encryption as described above to protect its confidentiality. As a measure against falsification of the production-equipment time-series data TSD_PE, a message authentication code (MAC) (not shown in the figure) may be assigned to the production-equipment time-series data TSD_PE having the data structure shown in FIG. 2.

The production-equipment identifier PE_ID is information for identifying production equipment PE, and for example, the serial number of the production equipment PE corresponds to this. The production-equipment time-series data identifier TSD_ID is information for identifying the production-equipment time-series data TSD_PE. The end-product identifier EP_ID is information for identifying an end product EP, and for example, the serial number of the end product EP corresponds to this. The data elements E1 to En are one or more data items included in the production-equipment time-series data TSD_PE, and indicate data on the settings and operation of the production equipment PE when the end product EP was produced, for example, temperature and pressure.

In the production-equipment time-series database DB1, a large quantity of production-equipment time-series data TSD_PE having the data structure shown in FIG. 2 is stored in an encrypted state. An encryption key for encrypting the production-equipment time-series data TSD_PE is managed inside the production equipment PE or managed by a trustworthy third party, and is not disclosed to the stakeholders shown in FIG. 1 unless a data disclosure request is made under the agreement between them. This will be described later in detail.

Figure 3:
FIG. 3 is a diagram showing the data structure of end-product individual data according to the embodiment.

FIG. 3 is a diagram showing an example of the data structure of the end-product individual data EPD.

As shown in FIG. 3, the end-product individual data EPD includes an end-product identifier EP_ID, a maintenance parameter MP, and correction history data CHD.

The end-product identifier EP_ID is information for identifying an end product EP as described above. The maintenance parameter MP is a parameter indicating the performance and properties of the end product EP. The correction history data CHD is data indicating a correction history of the maintenance parameter MP, and includes correction ground data as described later. Note that, the correction is not performed arbitrarily. It is performed based on ground data for correction, which is called as correction ground data. Details of the correction history data CHD will be described later, and thus its explanation is omitted herein.

FIG. 4 is a sequence chart for explaining the flow from the delivery of production equipment PE for producing end products EP to maintenance services for the end products EP.

The key technology vendor 2 manufactures production equipment PE and delivers it to the factory 3 (step S1).

The factory 3 produces end products EP, using the production equipment PE delivered by the key technology vendor 2 (step S2). The production equipment PE generates production-equipment time-series data TSD_PE when producing the end products EP. The production equipment PE subjects the generated production-equipment time-series data TSD_PE to a predetermined cryptographic concealment process and a predetermined falsification prevention process, and stores the encrypted production-equipment time-series data TSD_PE in the production-equipment time-series database DB1 on the cloud C (step S3).

The factory 3 ships the produced end products EP to the end-product seller 4 (step S4). At this time, the factory 3 notifies the end-product seller 4 of the end-product identifiers EP_ID and the catalogue value (specification value) of the maintenance parameters MP of the end products EP to be shipped (step S5).

The end-product seller 4 registers the end-product identifiers EP_ID and the catalogue value of the maintenance parameters MP of the end products EP notified by the factory 3 in the end-product individual database DB2 on the cloud C as end-product individual data EPD (step S6). The end-product seller 4 sells the end products EP (step S7).

An operator (or a manager) of the end-product operation environment 5 purchases an end product EP (step S8), and starts operating the end product EP in the end-product operation environment 5 (step S9). In the end-product operation environment 5, end-product operation time-series data TSD_EP is generated periodically, and is stored in the end-product operation time-series database DB3 on the cloud C (step S10).

The maintenance vendor 6 calculates the degree of deterioration, etc., of the end product EP operated in the end-product operation environment 5, using the end-product individual data EPD registered in the end-product individual database DB2 and the end-product operation time-series data TSD_EP stored in the end-product operation time-series database DB3 on the cloud C, and performs maintenance services such as replacement and preliminary maintenance (step S11).

Incidentally, after the operation of the end product EP is started in the end-product operation environment 5, it may be discovered that there is a discrepancy between the catalogue value and the realized values of the maintenance parameters MP of some end products EP produced in the factory 3. At this time, a further analysis is conducted to discover that the above discrepancy is found in the end products EP which were produced by operating the production equipment PE under specific conditions (that is, the factor in the discrepancy is identified). For example, the following case corresponds to the above case: the end products EP are seismic base-isolation rubber products and the maintenance parameters MP indicate the service lives, in which case it is discovered that the realized values of the service lives of some seismic base-isolation rubber products which were produced by operating the production equipment PE under specific conditions are longer than the catalogue value or shorter than the catalogue value. In such a case, it is necessary to identify the end products EP showing realized values different from the catalogue value (that is, identify the end products EP which were produced by operating the production equipment PE under the specific conditions), recalculate the maintenance parameters MP of the identified end products EP, and correct (update) the end-product individual data EPD registered in the end-product individual database DB2. The end products EP showing realized values different from the catalogue value will be hereinafter referred to as "correction target end products EP".

To identify the correction target end products EP, it is necessary to check whether the production equipment PE was operating under the specific conditions. That is, to identify the correction target end products EP, it is necessary to check the production-equipment time-series data TSD_PE stored in the production-equipment time-series database DB1. However, as described above, the production-equipment time-series data TSD_PE has been subjected to a cryptographic process and a falsification prevent process, and stored in the production-equipment time-series database DB1 in a state of being inaccessible to any stakeholders. Therefore, it is necessary to identify the correction target end products EP and correct the end-product individual data EPD of the correction target end products EP while ensuring the confidentiality of the production-equipment time-series data TSD_PE.

FIG. 5 is a sequence chart for explaining the flow from the discovery of a discrepancy between the catalogue value and the realized values of the maintenance parameters MP of some end products EP to the correction of the end-product individual data EPD of these end products EP.

First, the key technology vendor 2 creates a data correction program DCP which corrects the end-product individual data EPD of the correction target end products EP. A certificate by the key technology vendor 2 is issued and attached to the created data correction program DCP (step S21). The key technology vendor 2 encrypts the created data correction program DCP and transmits the encrypted data correction program DCP to the information processing apparatus 1 on the cloud C (step S22).

The key technology vendor 2 determines the range of disclosure of the production-equipment time-series data TSD_PE by human negotiations with the factory 3, and acquires a decryption key for decrypting the production-equipment time-series data TSD_PE corresponding to the determined range of disclosure. The key technology vendor 2 issues access permission data APD including the acquired decryption key for accessing the production-equipment time-series data TSD_PE corresponding to the range of disclosure (step S23). The key technology vendor 2 encrypts the issued access permission data APD and transmits the encrypted access permission data APD to the information processing apparatus 1 on the cloud C (step S24).

A more detailed description of steps S21 to S24, described above, will be given later with the description of FIG. 6.

Upon receiving the encrypted data correction program DCP and the encrypted access permission data APD, the information processing apparatus 1 decrypts them and decrypts the production-equipment time-series data TSD_PE corresponding to the range of disclosure on the basis of the data correction program DCP and the access permission data APD. The information processing apparatus 1 identifies the correction target end products EP on the basis of the decrypted production-equipment time-series data TSD_PE, and calculates corrected values of the maintenance parameters MP of the identified correction target end products EP (step S25).

The information processing apparatus 1 registers the calculated corrected values as the maintenance parameters MP included in the end-product individual data EPD of the identified correction target end products EP (step S26). Then, the information processing apparatus 1 notifies the maintenance vendor 6 that the end-product individual data EPD of the correction target end products EP has been corrected (step S27). The recipient of the notification in step S27 is not limited to the maintenance vendor 6, and for example, various stakeholders may be notified that the end-product individual data EPD has been corrected.

A more detailed description of steps S25 to S27, described above, will be given later with the description of FIG. 9.

Figure 6:
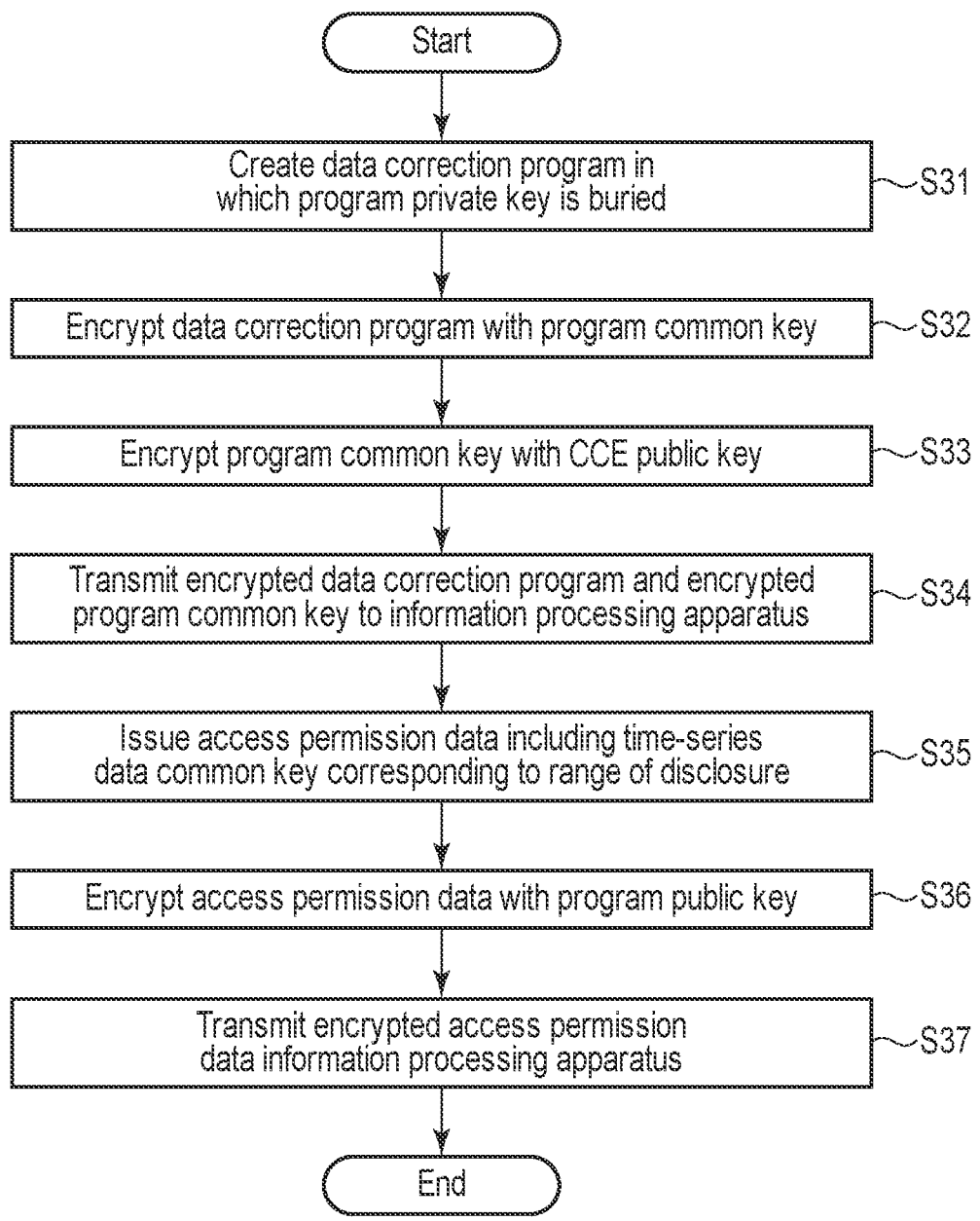
FIG. 6 is a flowchart for explaining the process executed by a key technology vendor according to the embodiment.

FIG. 6 is a flowchart for explaining steps S21 to S24 of FIG. 5 in more detail, and for explaining the process performed by the key technology vendor 2 to identify the correction target end products EP and correct the maintenance parameters MP of these end products EP.

First, the key technology vendor 2 (a first entity) creates a data correction program DCP in which a program private key Ks_DCP (a second private key) it holds is buried (step S31). Then, the key technology vendor 2 encrypts the created data correction program DCP with a program common key Kc_DCP (a first encryption key) it holds (step S32). In this manner, for example, as shown in FIG. 7, encrypted data D1 including the data correction program DCP in which the program private key Ks_DCP is buried and which is encrypted with the program common key Kc_DCP is generated.

Then, the key technology vendor 2 encrypts the program common key Kc_DCP, which was used to encrypt the data correction program DCP, with a CCE public key Kp_CCE (a first public key) made public by the information processing apparatus 1 (step S33). In this manner, for example, as shown in FIG. 7, encrypted data D2 including the program common key Kc_DCP encrypted with the CCE public key Kp_CCE is generated.

The key technology vendor 2 transmits the encrypted data D1 including the data correction program DCP encrypted in step S32 and the encrypted data D2 including the program common key Kc_DCP encrypted in step S33 to the information processing apparatus 1 (step S34).

On the other hand, the key technology vendor 2 determines the range of disclosure of the production-equipment time-series data TSD_PE by human negotiations with the factory 3, and then makes a data disclosure request to a manager who manages a time-series data common key Kc_TSD (a second encryption key) which is an encryption key used to encrypt the production-equipment time-series data TSD_PE. In this manner, the key technology vendor 2 can acquire the time-series data common key Kc_TSD (a target second encryption key), which functions as a decryption key for decrypting the production-equipment time-series data TSD_PE corresponding to the determined range of disclosure.

The key technology vendor 2 issues access permission data APD (a second data) including the time-series data common key Kc_TSD functioning as the decryption key for decrypting the production-equipment time-series data TSD_PE corresponding to the determined range of disclosure (step S35). The key technology vendor 2 encrypts the issued access permission data APD with a program public key Kp_DCP (a second public key) paired with the program private key Ks_DCP buried in the data correction program DCP (step S36). In this manner, for example, as shown in FIG. 7, encrypted data D3 including the access permission data APD which includes the time-series data common key Kc_TSD functioning as the decryption key and which is encrypted with the program public key Kp_DCP is generated.

Then, the key technology vendor 2 transmits the encrypted data D3 including the access permission data APD encrypted in step S36 to the information processing apparatus 1 (step S37), and the process herein ends.

While a case where the key technology vendor 2 executes the series of steps shown in FIG. 6 has been herein described, the embodiment is not limited to this case, and the series of steps shown in FIG. 6 may be executed by, for example, the factory 3.

Figure 8:
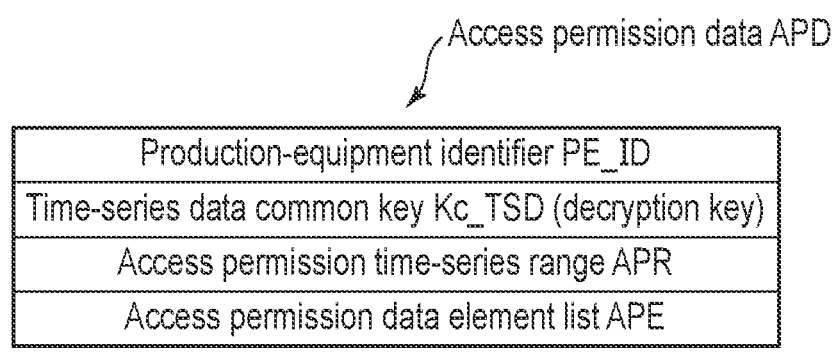
FIG. 8 is a diagram showing the data structure of access permission data according to the embodiment.

FIG. 8 is a diagram showing an example of the data structure of the access permission data APD.

As shown in FIG. 8, the access permission data APD includes a production-equipment identifier PE_ID, the time-series data common key Kc_TSD, an access permission time-series range APR, and an access permission data element list APE.

The production-equipment identifier PE_ID is information for identifying production equipment PE as described above. The time-series data common key Kc_TSD is a decryption key for decrypting the production-equipment time-series data TSD_PE corresponding to the range of disclosure indicated by the access permission time-series range APR.

The access permission time-series range APR indicates information for identifying the production-equipment time-series data TSD_PE corresponding to the range of disclosure. That is, the access permission time-series range APR indicates information for identifying the range of disclosure determined under the mutual agreement between the key technology vendor 2 and the factory 3 of the large quantity of production-equipment time-series data TSD_PE stored in the production-equipment time-series database DB1. For example, the access permission time-series range APR includes a production-equipment time-series data identifier TSD_ID indicating the production-equipment time-series data TSD_PE at the head of the range of disclosure and a production-equipment time-series data identifier TSD_ID indicating the production-equipment time-series data TSD_PE at the foot of the range of disclosure. Alternatively, the access permission time-series range APR may include the production-equipment time-series data identifiers TSD_ID of all the production-equipment time-series data TSD_PE included in the range of disclosure.

The access permission data element list APE indicates information for identifying the data elements, the disclosure of which has been determined by the mutual agreement between the key technology vendor 2 and the factory 3 of the data elements E1 to En included in the production-equipment time-series data TSD_PE corresponding to the range of disclosure.

Figure 9:
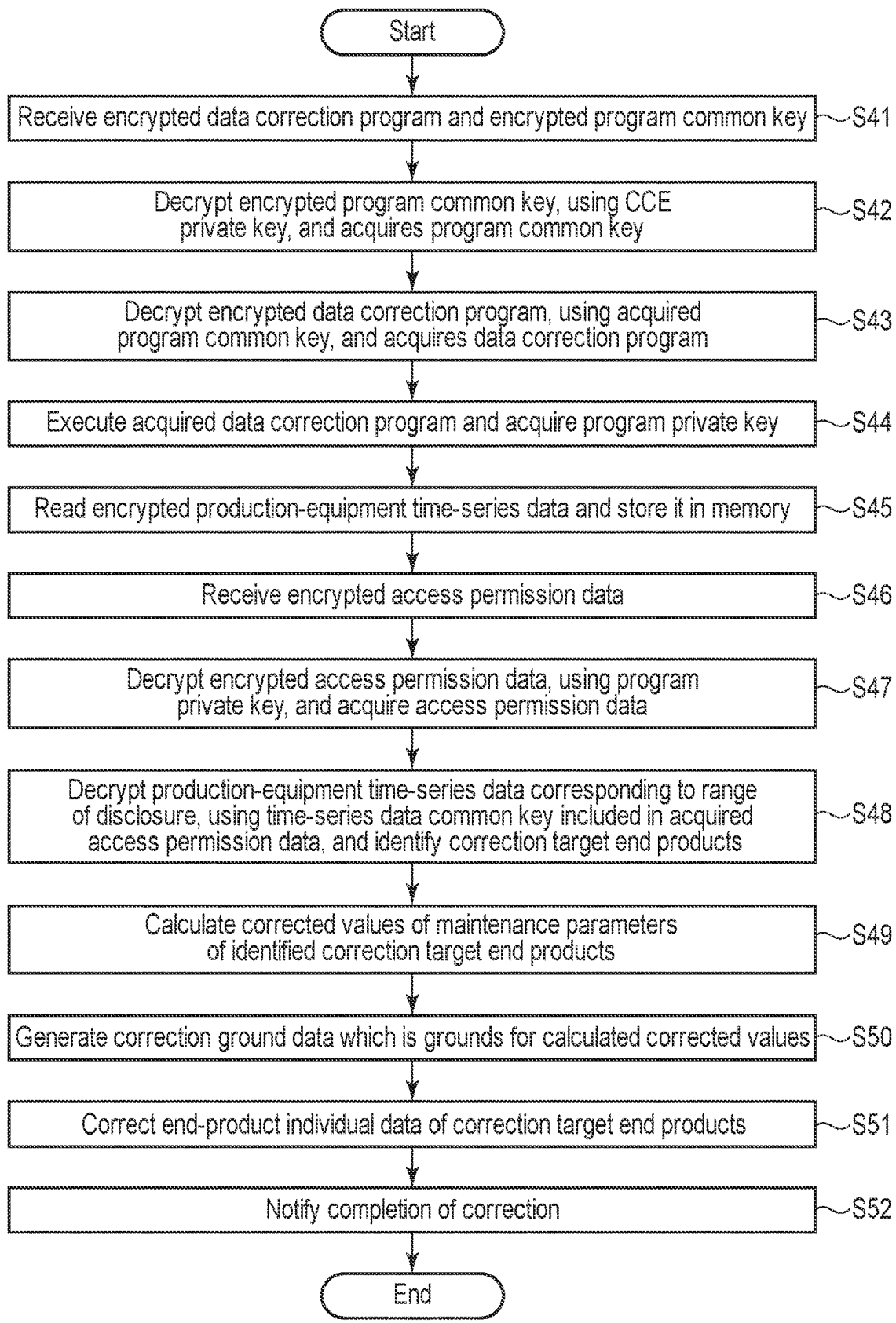
FIG. 9 is a flowchart for explaining the process executed by the information processing apparatus according to the embodiment.

FIG. 9 is a flowchart for explaining steps S25 to S27 of FIG. 5 in more detail, and for explaining the process executed by the information processing apparatus 1 to identify the correction target end products EP and correct the maintenance parameters MP of these end products EP.

When the information processing apparatus 1 receives the encrypted data D1 and the encrypted data D2 transmitted from the key technology vendor 2 (that is, receives the encrypted data correction program DCP and the encrypted program common key Kc_DCP) (step S41), the CPU 11 decrypts the received encrypted data D2, using a CCE private key Ks_CCE (a first private key) held inside the CPU 11, and acquires the program common key Kc_DCP from the encrypted data D2 (step S42).

Then, the CPU 11 decrypts the received encrypted data D1, using the acquired program common key Kc_DCP, and acquires the data correction program DCP from the encrypted data D1 (step S43). The CPU 11 executes the acquired data correction program DCP (step S44). In this manner, the CPU 11 can acquire the program private key Ks_DCP buried in the data correction program DCP (in other words, the program private key Ks_DCP, which is valid only in the environment in which the data correction program DCP is executed).

The information processing apparatus 1 reads production-equipment time-series data TSD_PE in an encrypted state from the production-equipment time-series database DB1, and temporarily stores it in the memory 12 (step S45).

When the information processing apparatus 1 receives the encrypted data D3 transmitted from the key technology vendor 2 (that is, the encrypted access permission data APD) (step S46), the CPU 11 decrypts the received encrypted data D3, using the program private key Ks_DCP, which is valid only in the environment in which the data correction program DCP is executed, and acquires the access permission data APD from the encrypted data D3 (step S47).

Then, the CPU 11 decrypts the production-equipment time-series data TSD_PE corresponding to the range of disclosure, using the time-series data common key Kc_TSD corresponding to the range of disclosure included in the acquired access permission data APD, and identifies correction target end products EP on the basis of the decrypted production-equipment time-series data TSD_PE (step S48). The CPU 11 calculates corrected values of the maintenance parameters MP of the identified correction target end products EP on the basis of the data correction program DCP and at least part of the decrypted production-equipment time-series data TSD_PE (step S49).

When the end-product individual data EPD corresponding to the correction target end products EP is, for example, data in a first period of time, the production-equipment time-series data TSD_PE corresponding to the range of disclosure is data in a second period of time which at least partly overlaps the first period of time. That is, the first period of time and the second period of time at least partly overlap.

The CPU 11 generates correction ground data CGD which is grounds for the calculated corrected values of the maintenance parameters MP on the basis of the production-equipment time-series data TSD_PE which was used to calculate the correction values of the maintenance parameters MP (step S50). The CPU 11 registers the calculated corrected values of the maintenance parameters MP and the generated correction ground data CGD as the end-product individual data EPD of the correction target end products EP.

In other words, the CPU 11 corrects (updates) the end-product individual data EPD of the correction target end products EP on the basis of the calculated corrected values of the maintenance parameters MP and the generated correction ground data CGD (step S51).

Then, the information processing apparatus 1 notifies various stakeholders (for example, the maintenance vendor 6) that the correction of the maintenance parameters MP of the correction target end products EP is complete (step S52), and the process herein ends.

Figure 10:
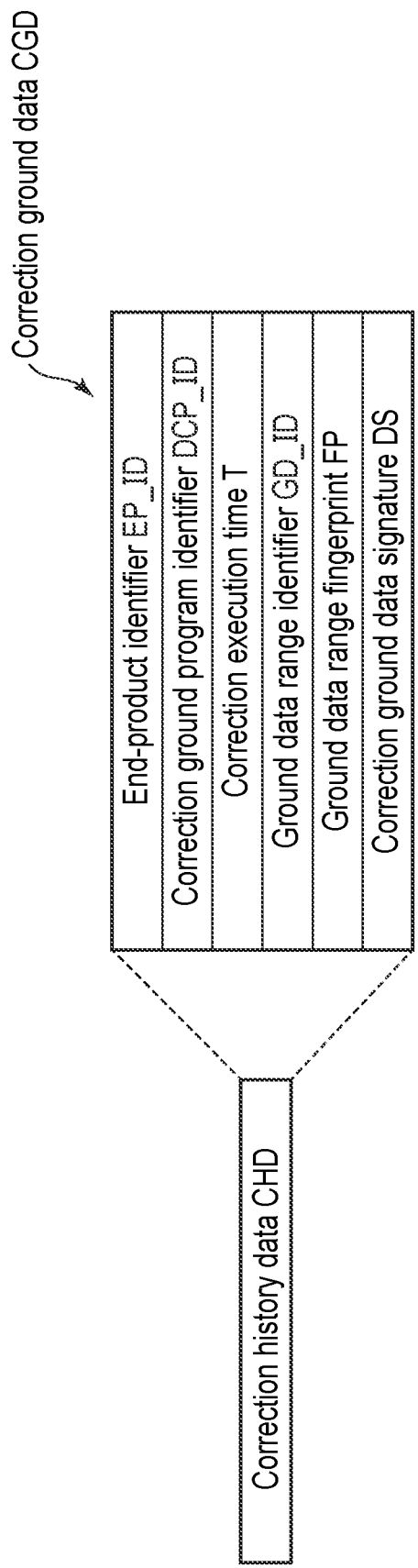
FIG. 10 is a diagram showing the data structure correction ground data according to the embodiment.

FIG. 10 is a diagram showing an example of the data structure of the correction ground data CGD.

As shown in FIG. 10, the correction ground data CGD includes an end-product identifier EP_ID, a correction ground program identifier DCP_ID, a correction execution time T, a ground data range identifier GD ID, a ground data range fingerprint FP, and a correction ground data signature DS.

The end-product identifier EP_ID is information for identifying an end product EP as described above. The correction ground program identifier DCP_ID is information for identifying a data correction program DCP used to correct end-product individual data EPD. The correction execution time T indicates the time when the end-product individual data EPD was corrected (that is, the time when a corrected value of a maintenance parameter MP was registered in the end-product individual database DB2 as the end-product individual data EPD). The ground data range identifier GD ID includes a production-equipment time-series data identifier TSD_ID of production-equipment time-series data TSD_PE used to calculate the corrected value of the maintenance parameter MP. The ground data range fingerprint FP indicates the hash value of the production-equipment time-series data TSD_PE used to calculate the corrected value of the maintenance parameter MP. The ground data range fingerprint FP may be the hash value of the production-equipment time-series data TSD_PE in an encrypted state or may be the hash value of the production-equipment time-series data TSD_PE in a decrypted state. The correction ground data signature DS is a signature which is generated for the correction ground data CGD, using the program private key Ks_DCP.

According to the above-described first embodiment, the information processing apparatus 1 can decrypt and execute an encrypted data correction program DCP in the confidential computing environment CCE. The information processing apparatus 1 thereby can use production-equipment time-series data TSD_PE for identifying correction target end products EP and for calculating corrected values of the maintenance parameters MP of the end products EP (i.e., correcting the end-product individual data EPD), while ensuring the confidentiality of the production-equipment time-series data TSD_PE. In other words, the information processing apparatus 1 can use production-equipment time-series data TSD_PE for identifying correction target past data, for correcting the past data, and as correction grounds for the corrected past data, while ensuring the confidentiality of the production-equipment time-series data TSD_PE.

In general, production-equipment time-series data TSD_PE is information including knowhow on the key technology vendor 2 side and knowhow on the factory 3 side, and thus has been unavailable in consideration of the risk of leaking outside. However, the information processing apparatus 1 of the present embodiment can use the production-equipment time-series data TSD_PE for correcting past data while eliminating the risk of leaking it outside.

In addition, the information processing apparatus 1 of the present embodiment generates correction ground data CGD for clarifying correction grounds, and registers the correction ground data CGD as correction history data CHD when correcting past data. Thus, the information processing apparatus 1 can ensure the traceability of the correction of the past data.

Moreover, the information processing apparatus 1 of the present embodiment generates a correction ground data signature DS assigned to the correction ground data CGD, using the program private key Ks_DCP, which is valid only in the environment in which the data correction program DCP is executed. Thus, the information processing apparatus 1 can eliminate the threat of the correction ground data signature DS being falsified.

Second Embodiment

A second embodiment will be described next. The second embodiment is different from the above-described first embodiment in that the correction target past data is end-product operation time-series data TSD_EP stored in an end-product operation time-series database DB3 as shown in FIG. 11. In addition, the second embodiment is different from the above-described first embodiment in that the time-series data which is used to correct past data with a data correction program DCP and which can be correction grounds is the correction target past data as shown in FIG. 11. Moreover, the second embodiment is different from the above-described first embodiment in that the time-series data which is used to correct past data with the data correction program DCP and which can be correction grounds is stored in an openly accessible database (that is, the end-product operation time-series database DB3) as shown in FIG. 11. In other words, the second embodiment is different from the above-described first embodiment in that the time-series data which can be correction grounds is open data. In the following description, points different from those in the first embodiment will be mainly explained, and the explanation of points similar to those in the first embodiment will be omitted.

In the second embodiment, it is assumed that end products EP are sensor devices which execute data processing and output the values of measurement targets as a result of the data processing (for example, sensors used to examine the water quality of rivers or blood sugar level sensors). In addition, in the second embodiment, it is assumed that a key technology vendor 2 is a software vendor that provides software for executing the above-described data processing which is installed in the above sensor devices. In addition, in the second embodiment, it is assumed that a factory 3 is a maker that produces the above-described sensor devices. Moreover, in the second embodiment, it is assumed that an end-product seller 4 is a store that sells the above-described sensor devices. Because an end-product operation environment 5 varies depending on the measurement targets of the sensor devices, its detailed explanation is omitted herein.

In the present embodiment, it is assumed that after the operation of an end product EP was started in the end-product operation environment 5, an error was discovered in the data processing executed by the end product EP, and the key technology vendor 2 updated software for executing the data processing. In this case, end-product operation time-series data TSD_EP output from the end product EP after the software update indicates a correct measured value, but end-product operation time-series data TSD_EP output before the software update and stored in the end-product operation time-series database DB3 remains indicating an erroneous measured value. The present embodiment explains a case where the end-product operation time-series data TSD_EP stored in the end-product operation time-series database DB3 before the software update corresponds to correction target past data, and the past data is corrected by a data correction program DCP.

Figure 12:
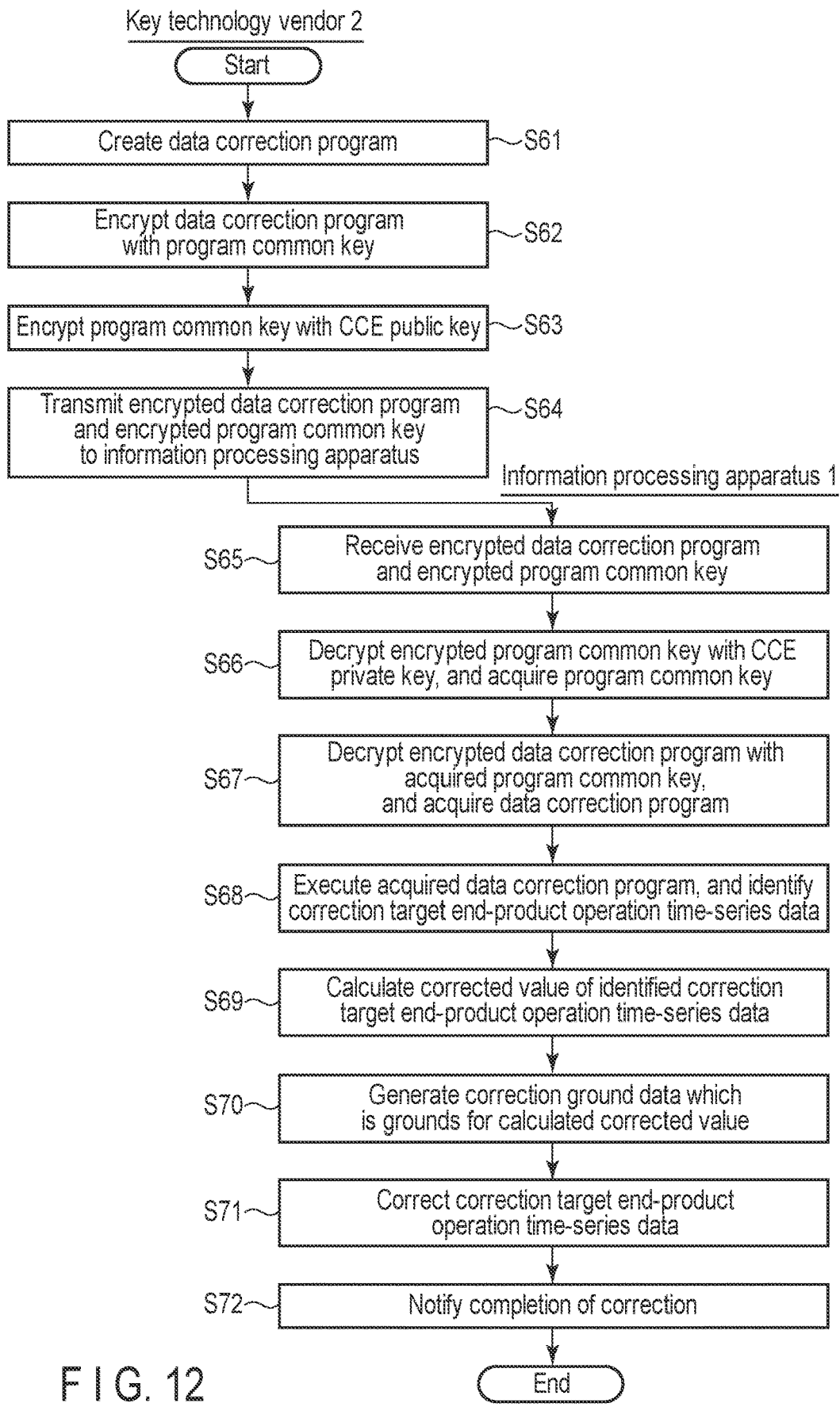
FIG. 12 is a flowchart for explaining the flow of the process executed by the interested parties according to the embodiment.

FIG. 12 is a flowchart for explaining the flow from the discovery of an error in the data processing executed by the end product EP to the correction of correction target end-product operation time-series data TSD_EP (that is, the end-product operation time-series data TSD_EP before the software update). The series of steps shown in FIG. 12 is executed under the mutual agreement between the key technology vendor 2 and the end-product operation environment 5.

First, the key technology vendor 2 creates a data correction program DCP which corrects the correction target end-product operation time-series data TSD_EP (step S61). The key technology vendor 2 encrypts the created data correction program DCP with a program common key Kc_DCP it holds (step S62).

Then, the key technology vendor 2 encrypts the program common key Kc_DCP, which was used to encrypt the data correction program DCP, with a CCE public key Kp_CCE made public by an information processing apparatus 1 (step S63).

The key technology vendor 2 transmits the encrypted data correction program DCP and the encrypted program common key Kc_DCP to the information processing apparatus 1 (step S64).

Upon receiving the encrypted data correction program DCP and the encrypted program common key Kc_DCP from the key technology vendor 2 (step S65), the information processing apparatus 1 decrypts the program common key Kc_DCP encrypted with the CCE public key Kp_CCE, using a CCE private key Ks_CCE held inside a CPU 11, and acquires the program common key Kc_DCP (step S66).

Then, the CPU 11 decrypts the data correction program DCP encrypted with the program common key Kc_DCP, using the acquired program common key Kc_DCP, and acquires the data correction program DCP (step S67).

The CPU 11 executes the acquired data correction program DCP, identifies the correction target end-product operation time-series data TSD_EP, and reads it from the end-product operation time-series database DB3 (step S68). The CPU 11 calculates a corrected value of the correction target end-product operation time-series data TSD_EP on the basis of the data correction program DCP and the acquired correction target end-product operation time-series data TSD_EP (step S69).

When the correction target end-product operation time-series data TSD_EP is, for example, data in a first period of time, the end-product operation time-series data TSD_EP actually used to calculate the corrected value is data in a second period of time which at least partly overlaps the first period of time. That is, the first period of time and the second period of time at least partly overlap.

The CPU 11 generates correction ground data which is grounds for the calculated corrected value on the basis of the correction target end-product operation time-series data TSD_EP (step S70). Then, the CPU 11 registers the calculated corrected value and the generated correction ground data in the end-product operation time-series database DB3 as the corrected end-product operation time-series data TSD_EP (step S71).

Then, the information processing apparatus 1 notifies various stakeholders (for example, the end-product operation environment 5) that the correction of the correction target end-product operation time-series data TSD_EP is complete (step S72), and the series of processes ends.

According to the above-described second embodiment, the information processing apparatus 1 can decrypt and execute an encrypted data correction program DCP and correct end-product operation time-series data TSD_EP, which is correction target past data, using the end-product operation time-series data TSD_EP, which is the correction target past data, as correction grounds in a confidential computing environment CCE.

In the end-product operation time-series database DB3, data which has not been subjected to the data processing by the end product EP (unprocessed data) may be further stored as information which is not openly accessible. In this case, it is preferable that the unprocessed data, for example, be encrypted such that it can be decrypted only in the environment in which the data correction program DCP is executed. This enables the information processing apparatus 1 to use the unprocessed data to correct past data with the data correction program DCP while ensuring the confidentiality of the unprocessed data. Thus, compared to when the unprocessed data is not used, more sophisticated correction is possible.

When the unprocessed data is transmitted from the end-product operation environment 5 to a cloud C in addition to open data, the transmission of the additional data may cause a delay in the data transmission and have a bad influence such as deterioration of the responsiveness of control executed with the open data. For this reason, it is preferable that the additional unprocessed data be separated from the open data and be transmitted at once, for example, during maintenance hours at night. This can prevent the above-described bad influence.

First Modified Example

The above-described second embodiment has explained a case where the end product EP executes data processing, data after the data processing (processed data) is stored in the end-product operation time-series database DB3, which is openly accessible, as end-product operation time-series data TSD_EP. A first modified example, described hereinafter, explains a case where as shown in FIG. 13, the end product EP does not execute data processing, unprocessed end-product operation time-series data TSD_EPA is stored in a concealed end-product operation time-series database DB3A, a data processor C1 on the cloud C executes data processing of the unprocessed end-product operation time-series data TSD_EPA, and processed end-product operation time-series data TSD_EPB is stored in an end-product operation time-series database DB3B which is openly accessible.

Figure 13:
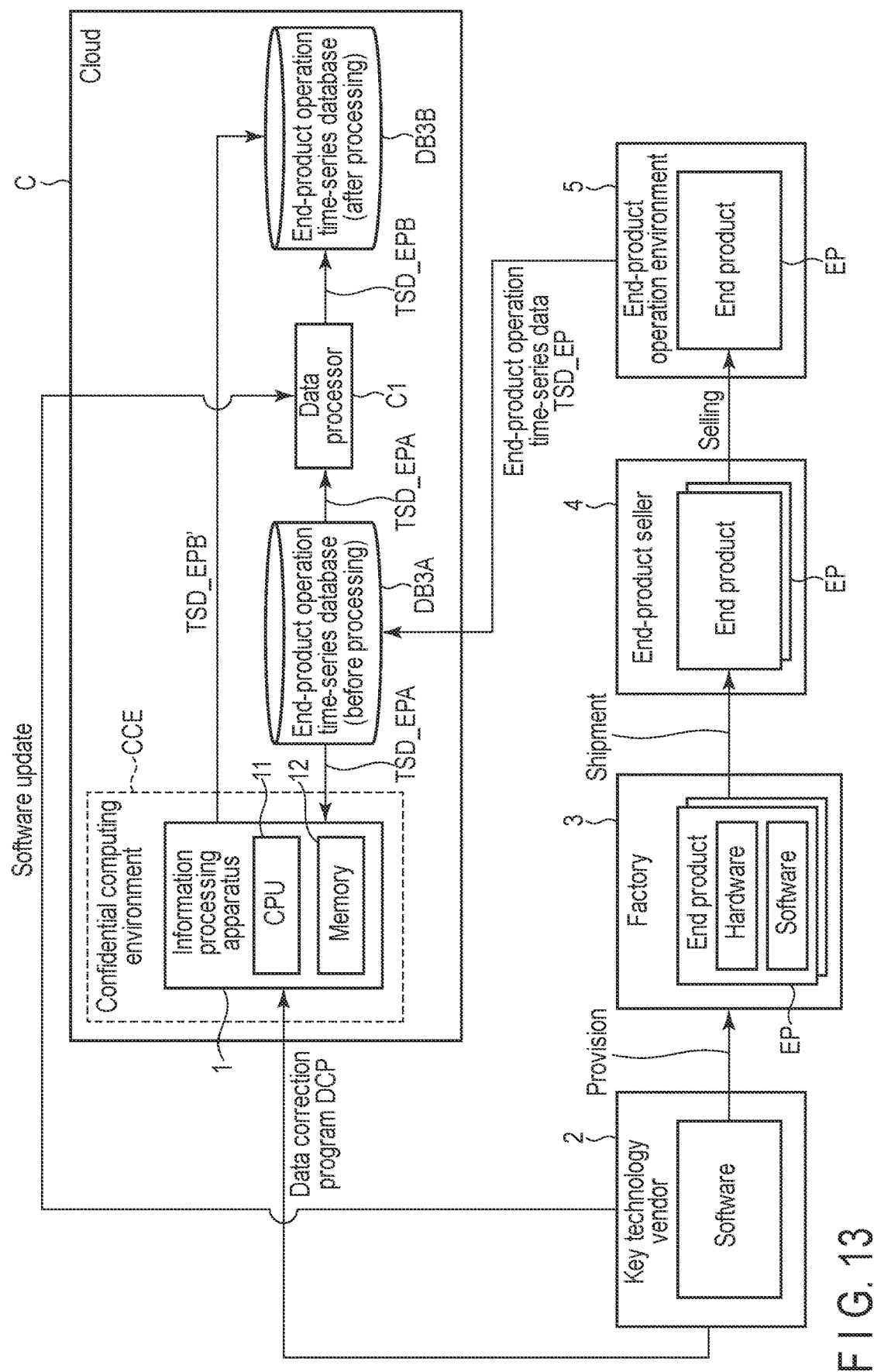
FIG. 13 is a diagram for explaining the information processing apparatus and the interested parties relating to the predetermined products according to a first modified example.

In this case, as shown in FIG. 13, the information processing apparatus 1 decrypts and executes an encrypted data correction program DCP transmitted from the key technology vendor 2, identifies correction target end-product operation time-series data TSD_EPB, reads end-product operation time-series data TSD_EPA corresponding to the correction target end-product operation time-series data TSD_EPB from the concealed end-product operation time-series database DB3A, and decrypts the end-product operation time-series data TSD_EPA, in the confidential computing environment CCE. The information processing apparatus 1 calculates a corrected value of the correction target end-product operation time-series data TSD_EPB on the basis of the data correction program DCP and the decrypted end-product operation time-series data TSD_EPA. The information processing apparatus 1 generates correction ground data which is grounds for the calculated corrected value on the basis of the end-product operation time-series data TSD_EPA used for data correction. The information processing apparatus 1 registers the calculated corrected value and the generated correction ground data in the end-product operation time-series database DB3B as the corrected end-product operation time-series data TSD_EPB.

According to the above-described first modified example, the information processing apparatus 1 can decrypt and execute an encrypted data correction program DCP, and correct end-product operation time-series data TSD_EPB, which is correction target past data, using end-product operation time-series data TSD_EPA corresponding to the end-product operation time-series data TSD_EPB, which is the correction target past data, as correction grounds, in the confidential computing environment CCE.

Second Modified Example

The above-described first modified example has explained a case where unprocessed end-product operation time-series data TSD_EPA is output from the one end-product operation environment 5, the data processor C1 on the cloud C executes data processing of the unprocessed end-product operation time-series data TSD_EPA, and processed end-product operation time-series data TSD_EPB is stored in the openly accessible end-product operation time-series database DB3B. In a second modified example, described hereinafter, as shown in FIG. 14, unprocessed end-product operation time-series data TSD_EPA1 and unprocessed end-product operation time-series data TSD_EPA2 are output from end-product operation environments 5A and 5B, respectively, and are stored in the concealed end-product operation time-series database DB3A. In addition, data processors C1A and C1B on the cloud C execute data processing of the end-product operation time-series data TSD_EPA1 and the end-product operation time-series data TSD_EPA2 output from the corresponding end-product operation environments 5A and 5B, respectively. A first anonymizing processor C2 on the cloud C executes statistical processing or anonymizing processing of processed end-product operation time-series data TSD_EPB1 and processed end-product operation time-series data TSD_EPB2, and anonymized end-product operation time-series data TSD_EPC is stored in the openly accessible end-product operation time-series database DB3B.

In the second modified example, it is assumed that the end products EP are smartphones which can measure location information, acceleration information, etc. In addition, in the second modified example, it is assumed that the key technology vendor 2 is a software vendor that provides software which is installed in smartphones and which is compatible with more than one type of smartphone. Moreover, in the second modified example, it is assumed that the factory 3 is a smartphone maker that produces more than one type of smartphone. In addition, in the second modified example, it is assumed that the end-product seller 4 is a store which sells more than one type of smartphone. Furthermore, in the second modified example, it is assumed that different types of smartphone are used by persons (individuals) in the end-product operation environments 5A and 5B. It is herein assumed that different types of smartphone produced by one maker are used by the persons, respectively. However, the present modified example is not limited to this case, and is also applicable to a case where different types of smartphone produced by more than one maker are used by the persons, respectively.

In addition, in the present modified example, it is assumed that after the operation of the end products EP was started in the end-product operation environments 5A and 5B, an error was discovered in the data processing executed by the data processor C1A of the data processors C1, and the key technology vendor 2 updated software corresponding to the data processor C1A (hereinafter referred to as the target data processor C1A), which executed erroneous data processing. In this case, processed end-product operation time-series data TSD_EPB1 output from the target data processor C1A after the software update indicates a correct measured value, whereas end-product operation time-series data TSD_EPB1 of an erroneous measured value remains reflected in the end-product operation time-series database DB3B. It is therefore necessary to calculate end-product operation time-series data TSD_EPB1' of a correct measured value and make it reflected in the end-product operation time-series database DB3B.

For this reason, the information processing apparatus 1 decrypts and executes an encrypted data correction program DCP and reads end-product operation time-series data TSD_EPA1 corresponding to the target data processor C1A from the concealed end-product operation time-series database DB3A and decrypts the end-product operation time-series data TSD_EPA1 in the confidential computing environment CCE. The information processing apparatus 1 calculates end-product operation time-series data TSD_EPB1' of a correct measured value on the basis of the data correction program DCP and the decrypted end-product operation time-series data TSD_EPA'. The information processing apparatus 1 outputs the end-product operation time-series data TSD_EPB1' of the correct measured value to a second anonymizing processor C3.

In addition, the information processing apparatus 1 outputs a command to re-execute data processing to the data processor C1B, which has executed correct data processing. The data processor C1B re-executes data processing of end-product operation time-series data TSD_EPA2 output from the corresponding end-product operation environment 5B, and outputs processed end-product operation time-series data TSD_EPB2 to the second anonymizing processor C3.

The second anonymizing processor C3 executes statistical processing or anonymizing processing of the end-product operation time-series data TSD_EPB1' output from the information processing apparatus 1 and the end-product operation time-series data TSD_EPB2 output from the data processor C1B, and anonymized end-product operation time-series data TSD_EPC' is stored in the openly accessible end-product operation time-series database DB3B as a corrected value which replaces the end-product operation time-series data TSD_EPC. The processing executed by the second anonymizing processor C3 may be executed in the confidential computing environment CCE.

Because location information and acceleration information measured by smartphones possessed by individuals include private information such as personal behavior and the conditions of their health, it is undesirable that to store such information in an openly accessible database as it is. On the other hand, such information is useful in effectively utilizing data over the entire product life cycle. Thus, it is preferable that such information be subjected to appropriate anonymizing processing and then be stored in an openly accessible database. In addition, if such information includes erroneous information, the quality of the information as openly accessible data deteriorates undesirably. Therefore, both correction of erroneous information and appropriate anonymizing processing are required. The above-described second modified example can satisfy such requirement and enable both appropriate data correction and privacy protection.

According to at least one of the above-described embodiments, an information processing apparatus, a method, and a storage medium which can correct past data appropriately can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of the information processing apparatus, the method, and the program derived from the specification are given below.

(1) An information processing apparatus which is allowed to access a storage device storing time-series data generated by a first device, the information processing apparatus comprising
    a processor holding a first public key and a first private key,
    the processor is configured to:
    acquire a program for correcting an error in first data on a first product and a first encryption key from a first entity, the program being encrypted with the first encryption key held by the first entity, the first encryption key being encrypted with the first public key,
    decrypt the encrypted first encryption key, using the first private key,
    decrypt the encrypted program, using the decrypted first encryption key,
    identify correction target first data from the first data by executing the decrypted program, correct the correction target first data, using data in a predetermined range of the time-series data, and
    generate ground data indicating correction grounds for the corrected correction target first data, based on the data in the predetermined range, and add the ground data to the corrected correction target first data.

(2) The information processing apparatus of (1), wherein the time-series data is encrypted with a second encryption key,
    the first entity holds a second public key and a second private key,
    the program includes the second private key, and
    the processor is configured to:
    acquire second data including a target second encryption key corresponding to the data in the predetermined range from the first entity, the second data being encrypted with the second public key,
    decrypt the encrypted second data, using the second private key, and
    decrypt the data in the predetermined range of the encrypted time-series data, using the target second encryption key included in the decrypted second data.

(3) The information processing apparatus of (2), wherein the processor is configured to generate a signature for the ground data, using the second private key, and add the generated signature to the ground data.

(4) The information processing apparatus of any one of (1) to (3), wherein
the correction target first data is data in a first period of time,
the data in the predetermined range is data in a second period of time, and
the first period of time and the second period of time overlap at least partly.

(5) The information processing apparatus of any one of (1) to (4), wherein
the ground data indicates data used to correct the correction target first data of the data in the predetermined range as the correction grounds.

(6) The information processing apparatus of (1), wherein
the first device is the first product, and
the correction target first data is the data in the predetermined range.

(7) A method applied to an information processing apparatus which is allowed to access a storage device storing time-series data generated by a first device and which comprises a processor holding a first public key and a first private key, the method comprising:
acquiring a program for correcting an error in first data on a first product and a first encryption key from a first entity, the program being encrypted with the first encryption key held by the first entity, the first encryption key being encrypted with the first public key;
decrypting the encrypted first encryption key, using the first private key;
decrypting the encrypted program, using the decrypted first encryption key;
identifying correction target first data from the first data by executing the decrypted program;
correcting the correction target first data, using data in a predetermined range of the time-series data; and generating ground data indicating correction grounds for the corrected correction target first data, based on the data in the predetermined range, and adding the ground data to the corrected correction target first data.

(8) The method of (7), wherein
the time-series data is encrypted with a second encryption key,
the first entity holds a second public key and a second private key,
the program includes the second private key, and the method further comprises:
acquiring second data including a target second encryption key corresponding to the data in the predetermined range from the first entity, the second data being encrypted with the second public key;
decrypting the encrypted second data, using the second private key; and
decrypting the data in the predetermined range of the encrypted time-series data, using the target second encryption key included in the decrypted second data.

(9) The method of (8), further comprising generating a signature for the ground data, using the second private key, and adding the generated signature to the ground data.

(10) The method of any one of (7) to (9), wherein
the correction target first data is data in a first period of time,
the data in the predetermined range is data in a second period of time, and
the first period of time and the second period of time overlap at least partly.

(11) The method of any one of (7) to (10), wherein
the ground data indicates data used to correct the correction target first data of the data in the predetermined range as the correction grounds.

(12) The method of (7), wherein
the first device is the first product, and
the correction target first data is the data in the predetermined range.

(13) A non-transitory computer-readable storage medium storing a computer program that, when executed by an information processing apparatus which is allowed to access a storage device storing time-series data generated by a first device and which comprises a processor holding a first public key and a first private key, causes a computer to:
acquire a program for correcting an error in first data on a first product and a first encryption key from a first entity, the program being encrypted with the first encryption key held by the first entity, the first encryption key being encrypted with the first public key;
decrypt the encrypted first encryption key, using the first private key;
decrypt the encrypted program, using the decrypted first encryption key;
identify correction target first data from the first data by executing the decrypted program;
correct the correction target first data, using data in a predetermined range of the time-series data; and
generate ground data indicating correction grounds for the corrected correction target first data, based on the data in the predetermined range, and adding the ground data to the corrected correction target first data.

What is claimed is:

1. An information processing apparatus which is allowed to access a storage device storing time-series data generated by a first device, the information processing apparatus comprising
a processor holding a first public key and a first private key,
the processor is configured to:
acquire a program for correcting an error in first data on a first product and a first encryption key from a first entity, the program being encrypted with the first encryption key held by the first entity, the first encryption key being encrypted with the first public key,
decrypt the encrypted first encryption key, using the first private key,
decrypt the encrypted program, using the decrypted first encryption key,
identify correction target first data from the first data by executing the decrypted program,
correct the correction target first data, using data in a predetermined range of the time-series data, and
generate ground data indicating correction grounds for the corrected correction target first data, based on the data in the predetermined range, and add the ground data to the corrected correction target first data.

2. The information processing apparatus of claim 1, wherein
the time-series data is encrypted with a second encryption key,
the first entity holds a second public key and a second private key,
the program includes the second private key, and the processor is configured to:
acquire second data including a target second encryption key corresponding to the data in the predetermined range from the first entity, the second data being encrypted with the second public key,
decrypt the encrypted second data, using the second private key, and
decrypt the data in the predetermined range of the encrypted time-series data, using the target second encryption key included in the decrypted second data.

3. The information processing apparatus of claim 2, wherein
the processor is configured to generate a signature for the ground data, using the second private key, and add the generated signature to the ground data.

4. The information processing apparatus of claim 1, wherein
the correction target first data is data in a first period of time,
the data in the predetermined range is data in a second period of time, and
the first period of time and the second period of time overlap at least partly.

5. The information processing apparatus of claim 1, wherein
the ground data indicates data used to correct the correction target first data of the data in the predetermined range as the correction grounds.

6. The information processing apparatus of claim 1, wherein
the first device is the first product, and
the correction target first data is the data in the predetermined range.

7. A method applied to an information processing apparatus which is allowed to access a storage device storing time-series data generated by a first device and which comprises a processor holding a first public key and a first private key, the method comprising:
acquiring a program for correcting an error in first data on a first product and a first encryption key from a first entity, the program being encrypted with the first encryption key held by the first entity, the first encryption key being encrypted with the first public key;
decrypting the encrypted first encryption key, using the first private key;
decrypting the encrypted program, using the decrypted first encryption key;
identifying correction target first data from the first data by executing the decrypted program;
correcting the correction target first data, using data in a predetermined range of the time-series data; and
generating ground data indicating correction grounds for the corrected correction target first data, based on the data in the predetermined range, and adding the ground data to the corrected correction target first data.

8. The method of claim 7, wherein
the time-series data is encrypted with a second encryption key,
the first entity holds a second public key and a second private key,
the program includes the second private key, and
the method further comprises:
acquiring second data including a target second encryption key corresponding to the data in the predetermined range from the first entity, the second data being encrypted with the second public key;
decrypting the encrypted second data, using the second private key; and
decrypting the data in the predetermined range of the encrypted time-series data, using the target second encryption key included in the decrypted second data.

9. The method of claim 8, further comprising
generating a signature for the ground data, using the second private key, and adding the generated signature to the ground data.

10. The method of claim 7, wherein
the correction target first data is data in a first period of time,
the data in the predetermined range is data in a second period of time, and
the first period of time and the second period of time overlap at least partly.

11. The method of claim 7, wherein
the ground data indicates data used to correct the correction target first data of the data in the predetermined range as the correction grounds.

12. The method of claim 7, wherein
the first device is the first product, and
the correction target first data is the data in the predetermined range.

13. A non-transitory computer-readable storage medium storing a computer program that, when executed by an information processing apparatus which is allowed to access a storage device storing time-series data generated by a first device and which comprises a processor holding a first public key and a first private key, causes a computer to:
acquire a program for correcting an error in first data on a first product and a first encryption key from a first entity, the program being encrypted with the first encryption key held by the first entity, the first encryption key being encrypted with the first public key;
decrypt the encrypted first encryption key, using the first private key;
decrypt the encrypted program, using the decrypted first encryption key;
identify correction target first data from the first data by executing the decrypted program;
correct the correction target first data, using data in a predetermined range of the time-series data; and
generate ground data indicating correction grounds for the corrected correction target first data, based on the data in the predetermined range, and adding the ground data to the corrected correction target first data.

* * * * *